US010399541B2

(12) United States Patent
Johnson (10) Patent No.: US 10,399,541 B2
(45) Date of Patent: *Sep. 3, 2019

(54) METHODS FOR MONITORING SAFETY BELT USAGE (71) Applicant: Marco Johnson, Lancaster, CA (US)

(72) Inventor: Marco Johnson, Lancaster, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/036,045

(22) Filed: Jul. 16, 2018

(65) Prior Publication Data

US 2019/0152431 A1    May 23, 2019

Related U.S. Application Data (63) Continuation of application No. 15/821,622, filed on Nov. 22, 2017, now Pat. No. 10,046,735.

(51) Int. Cl.
*B60R 22/48* (2006.01)
*G08B 3/10* (2006.01)
*G08B 21/18* (2006.01)
*G08B 21/24* (2006.01)
*G08B 21/02* (2006.01)

(52) U.S. Cl.
CPC ............... *B60R 22/48* (2013.01); *G08B 3/10* (2013.01); *G08B 21/02* (2013.01); *G08B 21/18* (2013.01); *G08B 21/24* (2013.01); *B60R 2022/4808* (2013.01); *B60R 2022/4816* (2013.01);
(Continued)

(58) Field of Classification Search
CPC ............ B60R 22/48; B60R 2022/4808; B60R 2022/4816; B60R 2202/4866; B60R 2202/4883; G08B 21/02; G08B 21/18; G08B 21/24
See application file for complete search history.

(56) References Cited

U.S. PATENT DOCUMENTS

| 2004/0068354 A1* | 4/2004 | Tabe | B60R 22/48 701/45 |
| 2013/0109342 A1* | 5/2013 | Welch | B60N 2/002 455/404.2 |

(Continued)

FOREIGN PATENT DOCUMENTS

IN    04222CH2013 A    3/2015

OTHER PUBLICATIONS

International Search Report & Written Opinion dated Dec. 20, 2018 from PCT Application No. PCT/US18/53803.

*Primary Examiner* — Andrew W Bee
(74) *Attorney, Agent, or Firm* — Innovation Capital Law Group, LLP; Vic Lin (57) ABSTRACT Methods and systems detect motion of a motor vehicle and detect whether the driver, and/or other occupants, are wearing their safety belts. A third party can be notified, in real-time, that the vehicle is being driven without the safety belts engaged. The user can then deliver an audio message to the user, either pre-recorded or live, to remind the user to fasten their safety belts. The third party also has an option of delivering a consequence to the user as a result of the detection of the safety belt not being engaged. Such consequence can include automatically limiting access to certain applications of the driver's smart phone for a certain period of time. The system can include a seat belt application detector, a vehicle motion detector, and wireless communication means to send a signal of safety belt application to the third party.

20 Claims, 4 Drawing Sheets (52) U.S. Cl.
CPC ................ *B60R 2022/4866* (2013.01); *B60R 2022/4883* (2013.01)

(56) References Cited

U.S. PATENT DOCUMENTS

| | | | |
|---|---|---|---|
| 2014/0256303 A1* | 9/2014 | Jones | H04W 4/027 |
| | | | 455/418 |
| 2015/0130605 A1* | 5/2015 | Helm | B60N 2/002 |
| | | | 340/457.1 |
| 2016/0293011 A1 | 10/2016 | Erlich et al. | |

* cited by examiner

METHODS FOR MONITORING SAFETY BELT USAGE

CROSS-REFERENCE TO RELATED APPLICATIONS

This application is a continuation of U.S. patent application Ser. No. 15/821,622, filed Nov. 22, 2017, the contents of which are herein incorporated by reference.

BACKGROUND OF THE INVENTION

1. Field of the Invention

Embodiments of the present invention relates generally to vehicle safety devices. More particularly, the invention relates to systems and methods for monitoring safety belt usage remotely by a third party.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Over the past 20-30 years, laws have been passed requiring motor vehicle operators and many passengers to wear safety belts. As a result, many drivers find the application of their safety belt a habit when driving. However, some drivers, especially new drivers or teenage drivers, for example, have not yet developed the habit of wearing their safety belt every time they get behind the wheel. Other drivers may not wish to wear their safety belts for any number of reasons.

These people who do not wear their safety belts may have other people in their lives that care of their well-being and encourage them to drive safely, including through the application of their safety belts. For example, parents of teenage drivers often need to remind their children to wear their safety belts. However, there are no ways to easily monitor and remind users when they start driving without their safety belts engaged.

In view of the foregoing, it is clear that there is a need for a system and method for signaling to a third party whether a safety belt is engaged and to provide safe feedback to a driver when such lack of engagement is detected.

SUMMARY OF THE INVENTION

Embodiments of the present invention provide a method for monitoring and reporting safety belt use comprising detecting, via a first monitoring device, motion of a vehicle having an occupant therein; detecting, via a second monitoring device, non-engagement of a safety belt of the occupant; sending a notification to a third party when non-engagement of the safety belt is detected; and playing an audio alert, from the third party, at an interior of the vehicle to remind the occupant to apply the safety belt.

Embodiments of the present invention further provide a method for monitoring and reporting safety belt use comprising detecting, via a first monitoring device, motion of a vehicle having an occupant therein; sending a motion signal from the first monitoring device to an occupant computing device running an occupant software application; detecting, via a second monitoring device, non-engagement of a safety belt of the occupant; sending a safety belt non-engagement signal from the second monitoring device to the occupant computing device; sending a notification, from the occupant computing device, to a third party when non-engagement of the safety belt is detected; and playing an audio alert, from the third party, on the occupant computing device to remind the occupant to apply the safety belt.

Embodiments of the present invention also provide a method for monitoring and reporting safety belt use comprising detecting, via a first monitoring device, motion of a vehicle having an occupant therein; sending a motion signal from the first monitoring device to an occupant computing device running an occupant software application; detecting, via a second monitoring device, non-engagement of a safety belt of the occupant; sending a safety belt non-engagement signal from the second monitoring device to the occupant computing device; sending a notification, from the occupant computing device, to a third party computing device when non-engagement of the safety belt is detected; playing an audio alert, from the third party computing device, on the occupant computing device to remind the occupant to apply the safety belt; and providing an electronic consequence to the occupant by the third party after the third party computing device receives a preset number of the notifications, the electronic consequence including limiting access to one or more software applications on the occupant computing device for a period of time.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or"

includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smart phone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

Broadly, embodiments of the present invention provide methods and systems for detecting motion of a motor vehicle and detecting whether the driver, and/or other occupants, are wearing their safety belts. At least when safety belts are not engaged and vehicle movement is detected, a third party can be notified, in real-time, that the vehicle is being driven without the safety belts engaged. The user can then deliver an audio message to the user, either pre-recorded or live, to remind the user to fasten their safety belts. The third party also has an option of delivering a consequence to the user as a result of the detection of the safety belt not being engaged. Such consequence, which may be electronically delivered from a computing device of the third party to a mobile device or smart phone of the driver, can include limiting access to certain applications of the driver's smart phone for a certain period of time. The system can include a seat belt application detector, a vehicle motion detector, and wireless communication means to send a signal of safety belt application to the third party.

As used herein, the term "vehicle" can refer to a machine that transports people or cargo. Vehicles include wagons, bicycles, motor vehicles (motorcycles, cars, trucks, buses), railed vehicles (trains, trams), watercraft (ships, boats), amphibious vehicles (screw-propelled vehicle, hovercraft), aircraft (airplanes, helicopters) and spacecraft.

Referring to FIGS. 1 through 4, a first monitoring device 10 has a connector 14 that can be installed in a vehicle's on-board diagnostics (OBD) port 12. The first monitoring device 10 may include a memory and processor 18 and a wireless communication device 16.

Figure 2:
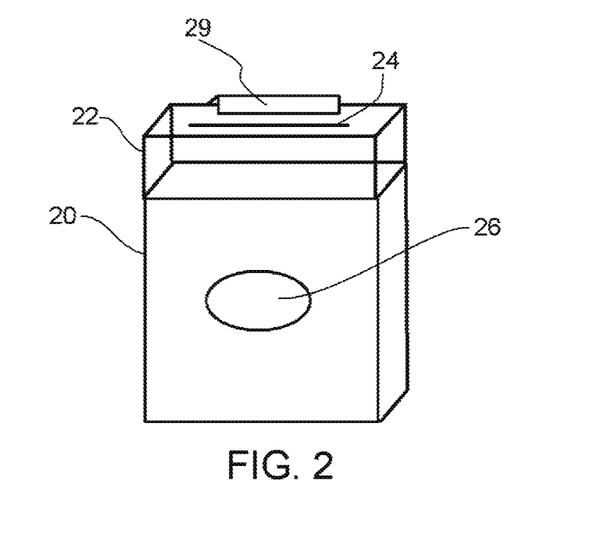
FIG. 2 illustrates a side view of a safety belt connector having a second monitoring device plugged therein and configured to receive a safety belt.
Figure 4:
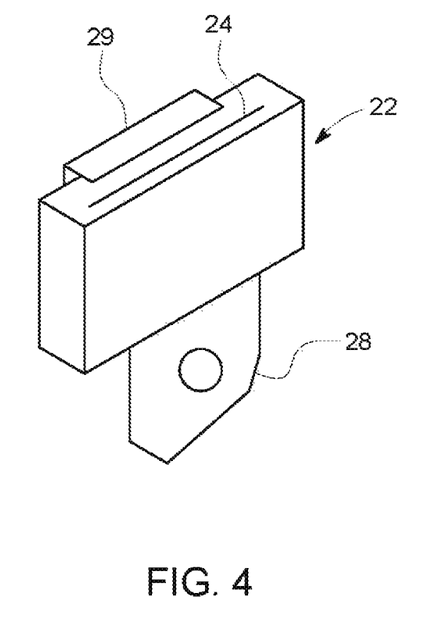
FIG. 4 illustrates a perspective view of the second monitoring device of FIG. 2 disconnected from the safety belt connector.
Figure 5:
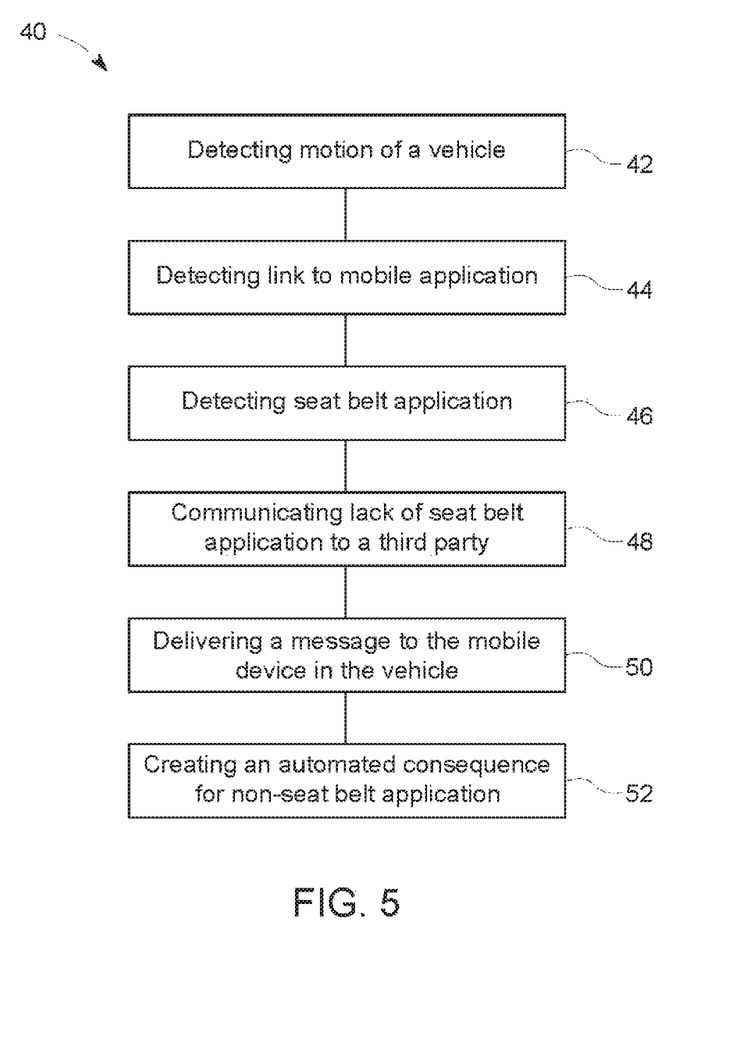
FIG. 5 illustrates method steps in a method for monitoring use of a safety belt by a third party according to an exemplary embodiment of the present invention.

A second monitoring device 22 has a tongue 28 that can fit into a safety belt receptacle 20. A slot 24 on a top side of the second monitoring device 22 can receive a safety belt tongue (not shown) of a vehicle's safety restraint system. A button 29 may be used to remove the safety belt tongue from the second monitoring device 22 and a release button 26, as is known in the art, may be used to remove the second monitoring device 22 from the safety belt receptacle 20. Like the first monitoring device 10, the second monitoring device 22 can include a memory and processor 18A and a wireless communication device 16A.

As described below, one or both of the first and second monitoring devices 10, 22 may be used in various embodiments of the present invention. In some embodiments, a vehicle occupant's wireless communication device, such as a smart phone 30, may include a software application, as described below, that interfaces with one or both of the first and second monitoring devices 10, 22. In some embodiments, the software application on the smart phone 30 may interact with the vehicle and may take the place of one or both of the first and second monitoring devices 10, 22. In other words, the first and second monitoring devices 10, 22 may not be required as physical devices, but may be part of the software application on the smart phone 30 which may detect vehicle motion, safety belt usage, or the like.

Figure 3:
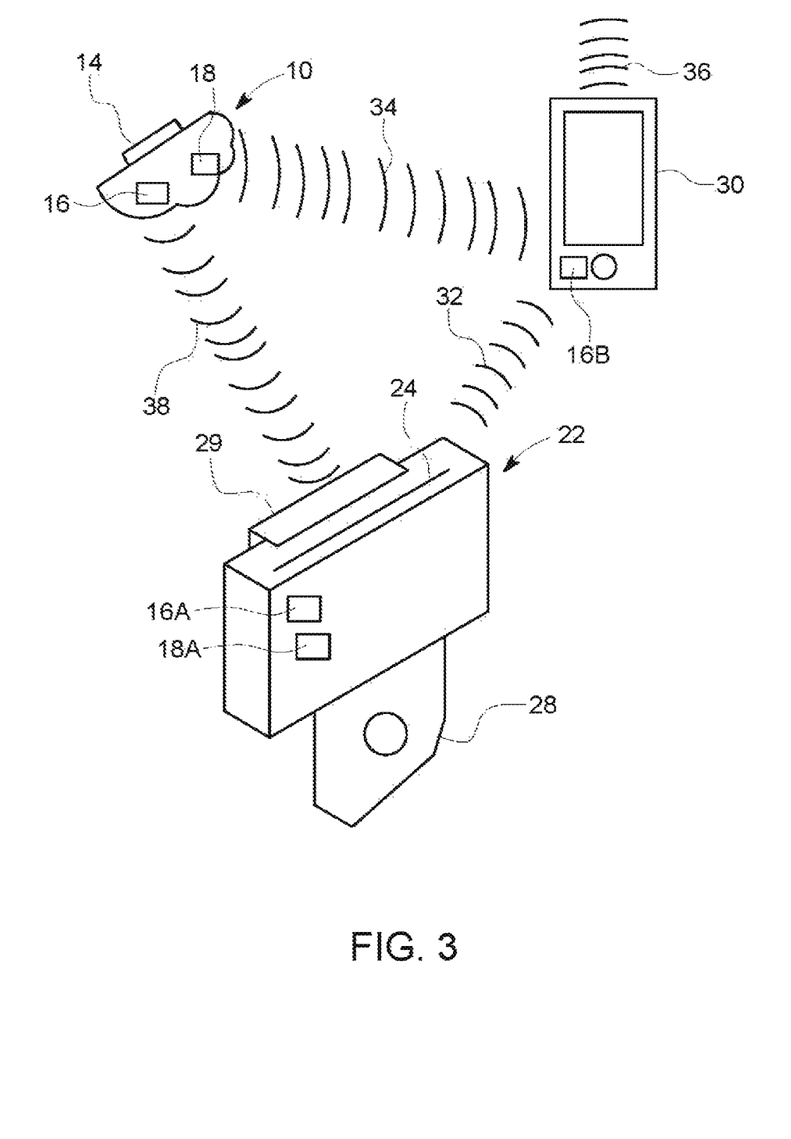
FIG. 3 illustrates various exemplary communications between the first monitoring device of FIG. 1, the second monitoring device of FIG. 2 and a mobile computing device.

As shown in FIG. 3, the first monitoring device 10 may communicate with the smart phone 30 via a wireless signal 34 via the wireless communication device 16A. This wireless signal may operate via various communication protocols, such as Bluetooth® wireless protocol. Similarly, the second monitoring device 22 may communicate with the smart phone 30 via a wireless signal 32 in the same or in an alternate manner. In some embodiments, the first and second monitoring devices 10, 22 may communicate with each other via a wireless signal 38.

In some embodiments, the first and second monitoring devices 10, 22 may communicate with the smart phone 30 via a short range wireless communication protocol, such as Bluetooth® if available. If a connection cannot be established, in some embodiments, the first and second monitoring devices may attempt alternate communication protocols, such as 3G, 4G, or the like.

Figure 1:
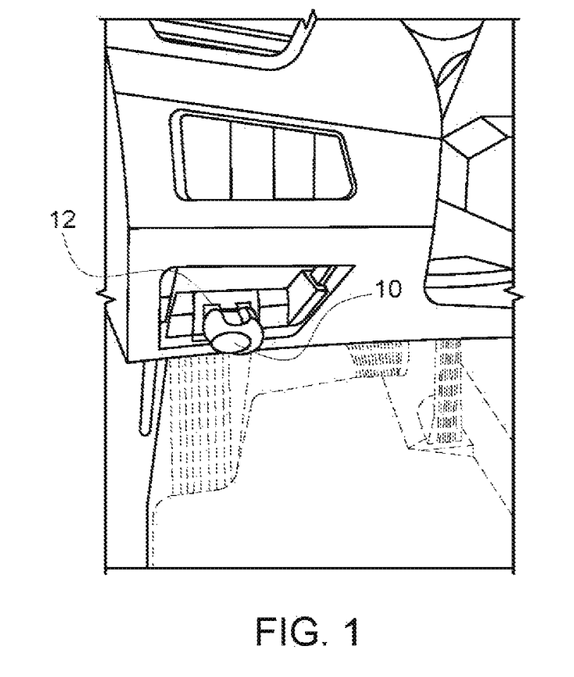
FIG. 1 illustrates a partial perspective view of a dashboard of a vehicle, showing a first monitoring device plugged into its on-board diagnostic (OBD) port.

Depending on vehicle configuration and design, a safety belt non-application signal may be available at the OBD port 12. In this configuration, the first monitoring device 10 may be used to detect the application of the safety belt and the second monitoring device 22 may not be required. In other embodiments, the second monitoring device 22 may be used to detect the engagement of the user's safety belt. In still other embodiments, the software on the smart phone 30 may connect with the vehicle to detect safety belt application. In some embodiments, vehicle motion may be detected by a vehicle speed and/or rpm indicator as may be available at the OBD port 12. In this embodiment, the smart phone 30 may receive the wireless signal 34 to indicate operation of the vehicle and may also receive the wireless signal 32 to indicate engagement of the safety belt. In some embodiments, vehicle motion may be detected by a GPS feature of the smart phone 30. In this embodiment, the first monitoring device 10 may not be required in the overall system.

Thus, as outlined above, the overall system may include one or both of the first and second monitoring devices 10, 22, or none of the first and second monitoring devices 10, 22 when the features of these devices are included in the software application of the smart phone 30. Typically, the vehicle user's smart phone 30 will also be a component of the system of the present invention, where a software application on the smart phone 30 is used as described below.

The smart phone 30 may include a software application operable to run on a processor thereof. The software application can include program code to cause the various functions, as described herein, to be performed. The software application may be programmed to automatically connect, via a short range wireless communication protocol, to any of the first and second monitoring devices 10, 22 that are present. Once connected, the software may receive a first signal that determines the user is in a moving vehicle. This signal can be from the first monitoring device 10 that can receive a speed and/or rpm signal from the OBD port 12 or this signal can be from an internal GPS of the smart phone 30, where the software application may monitor movement of the smart phone 30 and may be programmed to recognize certain movement as vehicular movement.

Once the first signal is received that determines that the user is in a moving vehicle, the software application can receive a second signal which may be indicative of application or non-application of a safety belt. As discussed above, the second signal may come from the first monitoring device 10, when the OBD port 12 provides a safety belt application signal, or may come from the second monitoring device 22, which is physically positioned to receive the user's safety belt tongue.

If the second signal indicates the non-application of the vehicle occupant's safety belt, a wireless signal 36 may be sent to a third party (not shown) via a push notification, an SMS message, an email message, or the like. The third party may be an individual or a plurality of individuals, as may be set up within the software application on the smart phone 30. In some embodiments, the third party may be operating a software application, herein referred to as the third-party software application, on a mobile computing device, such as a smart phone 40. The third-party software application may be opened by the third party or may be opened automatically upon receiving the second signal indicative of the non-application of the vehicle occupant's safety belt. The third-party software application may allow the user to send an audio message back to the vehicle occupant's smart phone 30, which may, for example, remind the vehicle occupant to fasten their safety belt. In some embodiments, this audio message may be sent in real-time, whereas in other embodiments, a pre-recorded message may be automatically sent to the smart phone 30. Other alerts may be included within the scope of the present invention, such as a repeating message or signal being played on the vehicle occupant's smart phone 30 until the safety belt is engaged.

If the second signal indicates the non-application of the vehicle occupant's safety belt, in some embodiments, additional data may be sent to the third party's smart phone 40. This additional information may include GPS data, date, time, distance travelled without a safety belt engaged, or the like.

The third-party software application may also be used to provide a consequence to the vehicle occupant. For example, the third-party software application may be configured to instruct the software application on the vehicle occupant's smart phone 30 to prevent access to one or more other software applications for a given period of time. For example, the third party that is monitoring the vehicle occupant's safety belt use, such as a parent monitoring safety belt use of their child, may block access to one or more social media applications for a number of hours when their safety belt is not engaged.

Various fail-safe mechanisms may be included within the system and methods of the present invention. In some embodiments, the software application on the vehicle occupant's smart phone 30 may send a periodic signal to the third party's smart phone 40 or may send a signal to the third party's smart phone 40 when the software application is terminated. Thus, the third party may receive an indication that the vehicle operator's smart phone 30 is no longer obtaining a safety belt application signal. In some embodiments, if vehicle motion is detected but there is a lack of any communication regarding safety belt application or non-application, such a signal may be sent to the third-party smart phone 40 for further diagnostics.

In some embodiments, if a vehicle occupant is operating the vehicle without his or her smart phone 30, one or both of the first and second monitoring devices 10, 22 may detect vehicle motion and non-application of a safety belt, but may not be connected to the smart phone 30 via the typical short range wireless communication protocol. When this occurs, in one embodiment, the processor and memory 18, 18A of the first and second monitoring devices 10, 22 may store the occurrence of the non-engagement of the safety belt for later reporting. In other embodiments, the wireless communication device 16, 16A in either of the first and second monitoring devices 10, 22 may send a signal via a long range wireless protocol, such as 3G, 4G, LTE, or the like, to the smart phone 30 or directly to the third party smart phone 40. In some embodiments, data regarding the user's safety belt application may be stored by the processor and memory 18, 18A, while in other embodiments, the vehicle occupant's smart phone 30 may store such safety belt data, where users, such as the third party, via the third part software application, may access historical data on safety belt application.

In some embodiments, the vehicle occupant's smart phone 30 may also receive a signal indicating the presence of a passenger in the front seat. This signal may be, for example, based on a passenger air bag being turned on or off, as is conventionally performed by many vehicles automatically. A second one of the second monitoring devices 22 may be disposed in the passenger's safety belt receptacle to detect the engagement of the passenger's safety belt. In some embodiment, the software on the vehicle occupant's smart phone 30 may receive a further signal from this second one of the second monitoring devices 22 and report any non-engagement of the vehicle occupants' safety belts to the third party smart phone 40.

In some embodiments, for example, where a parent may have two or more children using the same motor vehicle, the software application on the third party's smart phone 40 may detect which user is in the vehicle based on the identification received from the vehicle occupant's smart phone 30.

While the above description and figures show the second monitoring device 22 plugged into the safety belt receptacle 20, where the safety belt tongue of the vehicle plugs into the second monitoring device 22, other configurations are possible provided that the second monitoring device 22 can detect when the safety belt of the vehicle is engaged. For example, the second monitoring device 22 may be disposed on the side of the receptacle 20 to permit the safety belt of the vehicle to directly connect to the receptacle 20 while still detecting the engagement thereof. In this embodiment, the slot 24 of the second monitoring device 22 would not be necessary since the vehicle's safety belt is being connected to the receptacle 20 in a conventional manner.

While the above description describes the vehicle occupant's smart phone 30 and the third party's smart phone 40, various computing devices may be used in lieu of the described smart phones. For example, a tablet computer may be used in place of one or both of the described smart phones. In some embodiments, the vehicle itself may be configured with the software application that is described above as being on the vehicle occupant's smart phone 30. In this embodiment, the vehicle itself may be configured to send the wireless signal 36 to the third party's smart phone 40 regarding the non-engagement of a vehicle occupant's safety belt.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for monitoring and reporting safety belt use, comprising:
   detecting, via a first monitoring device, motion of a vehicle having an occupant seated on a seat therein;
   detecting, via a second monitoring device, non-engagement of a safety belt of the seat of the occupant;
   sending a notification, via a software application resident on an occupant's computing device, to a third party when non-engagement of the safety belt is detected; and
   playing an audio alert, via the software application, from the third party, at an interior of the vehicle to remind the occupant to apply the safety belt.

2. The method of claim 1, wherein the vehicle is selected from the group consisting of a motor vehicle, a motorcycle, a car, a truck, a bus, a railed vehicle, a train, a tram, a watercraft, a ship, a boat, an amphibious vehicle and an aircraft.

3. The method of claim 1, wherein the audio alert is a voice message delivered in real time from the third party to the occupant.

4. The method of claim 1, further comprising an occupant computing device carried by the occupant, the occupant computing device having an occupant software application with program code for
receiving a first signal indicating motion of the vehicle and a second signal indicating non-engagement of the safety belt of the occupant; and
sending the notification to the third party.

5. The method of claim 4, wherein the audio alert is played from the occupant computing device.

6. The method of claim 5, further comprising a third party computing device having a third party software application with program code for
receiving the notification of non-engagement of the safety belt; and
configuring the audio alert to be played to the interior of the vehicle.

7. The method of claim 4, wherein the occupant computing device is a smart phone.

8. The method of claim 1, further comprising providing an electronic consequence to the occupant by the third party.

9. The method of claim 8, wherein the electronic consequence includes automatically blocking access to one or more software applications on an occupant computing device for a period of time.

10. The method of claim 1, wherein the first monitoring device and the second monitoring device are integrated in a single structure.

11. The method of claim 1, wherein the first monitoring device is connected to an on-board diagnostic port of the vehicle and the second monitoring device is connected to a safety belt receptacle of the vehicle.

12. The method of claim 1, wherein the first monitoring device and the second monitoring device include a communication chip for sending a wireless signal.

13. A method for monitoring and reporting safety belt use, comprising:
detecting, via a first monitoring device, motion of a vehicle having an occupant seated in a seat therein;
sending a motion signal from the first monitoring device to an occupant computing device running an occupant software application;
detecting, via a second monitoring device, non-engagement of a safety belt of the seat of the occupant;
sending a safety belt non-engagement signal from the second monitoring device to the occupant computing device;
sending a notification, from the occupant computing device, to a third party when non-engagement of the safety belt is detected; and
playing an audio alert, from the third party, on the occupant computing device to remind the occupant to apply the safety belt.

14. The method of claim 13, wherein the audio alert is a voice message delivered in real time from the third party to the occupant.

15. The method of claim 13, wherein the occupant computing device is a smart phone.

16. The method of claim 13, further comprising a third party computing device having a third party software application with program code for
receiving the notification of non-engagement of the safety belt; and
configuring the audio alert to be played to the interior of the vehicle.

17. The method of claim 13, wherein the first monitoring device and the second monitoring device are integrated in a single structure.

18. The method of claim 13, wherein the first monitoring device is connected to an on-board diagnostic port of the vehicle and the second monitoring device is connected to a safety belt receptacle of the vehicle.

19. A method for monitoring and reporting safety belt use, comprising:
detecting, via a first monitoring device, motion of a vehicle having an occupant seated in a seat therein;
sending a motion signal from the first monitoring device to an occupant computing device running an occupant software application;
detecting, via a second monitoring device, non-engagement of a safety belt of the seat of the occupant;
sending a safety belt non-engagement signal from the second monitoring device to the occupant computing device;
sending a notification, from the occupant computing device, to a third party computing device when non-engagement of the safety belt is detected;
playing an audio alert, from the third party computing device, on the occupant computing device to remind the occupant to apply the safety belt; and
providing an electronic consequence to the occupant by the third party after the third party computing device receives a preset number of the notifications, the electronic consequence including limiting access to one or more software applications on the occupant computing device for a period of time.

20. The method of claim 19, wherein the audio alert is a voice message delivered in real time from the third party computing device to the occupant computing device.

* * * * *